Patented Sept. 25, 1923.

1,468,957

UNITED STATES PATENT OFFICE.

LEIGH E. BROWNELL, OF ST. PAUL, MINNESOTA, ASSIGNOR, BY MESNE ASSIGNMENTS, TO BROWNELL WILDFIRE BATTERY CO. INC., A CORPORATION OF DELAWARE.

COMPOSITION OF MATTER.

No Drawing.  Application filed April 17, 1922. Serial No. 554,186.

*To all whom it may concern:*

Be it known that I, LEIGH E. BROWNELL, a citizen of the United States, residing at St. Paul, in the county of Ramsey and State of Minnesota, have invented certain new and useful Improvements in Composition of Matter, of which the following is a specification.

This invention relates to liquid compound for filling electric storage batteries in place of the liquid filler known as sulphuric electrolyte which is now in common use.

In carrying out my invention I preferably employ the following ingredients in the proportions specified, the component parts being mixed together in cold form:

Based upon a quantity of 100 gallon mixture I mix into 80 gallons of pure distilled water 20 gallons of commercially pure oil of vitriol or sulphuric acid. Into this mixture while the same is heated by the mixing of the sulphuric acid in water I add one-half pound to the gallon of Epsom salts, mixing the same by constant stirring until thoroughly dissolved; adding also one-quarter pound to the gallon of alum, one-third pound to the gallon of glycerine and a desired color constituent as aniline color.

The compound thus formed when cooled to the temperature of 70 degrees Fahrenheit is ready to be used as a liquid filler for electric storage batteries.

The action of the Epsom salts in the mixture is essentially to remove sulphation of the plates; the action of the alum as a hardening for the plate filling, and the glycerine as a softener for the plate filling. I do not restrict myself to this particular form of salts or hardening and softening ingredients, but may use other ingredients that have the same action. The aniline color used for the purpose of coloring the compound may be used or omitted as desired.

By the use of this compound great advantages are secured over the use of the ordinary sulphuric electrolyte. A battery containing my compound will receive and store an electric current much quicker than a battery filled with a sulphuric electrolyte as now in use, and without harm to the battery, and there being no impurities in this compound as there are in the sulphuric electrolyte ordinarily in use, the life of the electric storage battery will be prolonged.

A battery containing my compound will continue to receive and store such current as may be generated by an electric generator to which the battery may be connected and render unnecessary the common practice of placing the battery on charge by inducing electric current from other sources.

My compound can be successfully used in electric storage batteries by removing the old electrolyte filler from the battery, rinsing out the interior of said battery with pure water, and then introducing this compound to replace the liquid electrolyte filler and I have found by experimentation that the introduction of my compound in an electric storage battery in the manner set forth will cause an electrical current to be set up in sufficient quantity, in from five to thirty minutes' time, to make the battery fit for use in an automobile for starting and ignition purposes.

I have, also, found by use that the above described compound may be used successfully in electric storage batteries when they have deteriorated by use to such an extent that they will not hold an electric charge induced by the present method of charging from outside sources.

The function of Epsom salts, sodium sulphate, or potassium sulphate in a battery solution, as employed by me, serves to reduce the resistance of the solution to the passage of the electric current. This results in less heat being produced in the battery and, accordingly, prevents sulphation. These salts would have some solvent action on the lead sulphate in a sulphated battery and consequently would aid in removing the sulphation.

Glycerine is the heavy alcohol, and when used in my compound has a temporary effect in softening or loosening the sulphation.

I claim:

1. A battery filling compound, composed of a mixture of sulphuric acid and water, with the admixture of a salt, alum, and glycerine.

2. A battery filling compound, consisting of sulphuric acid mixed in water, with the admixture of approximately one-half pound of Epsom salts to the gallon, one-quarter of a pound of alum, and one-third of a pound of glycerine.

3. A battery filling compound, consisting of sulphuric acid mixed in water, with the admixture of a salt, and a plate filling hardening ingredient as alum, and a plate softening ingredient as glycerine.

4. A battery filling compound, composed of sulphuric acid mixed with water and with the admixture of Epsom salts, alum and glycerine in substantially the proportions specified.

In testimony whereof I affix my signature.

LEIGH E. BROWNELL.